United States Patent
Potts et al.

[15] 3,697,099
[45] Oct. 10, 1972

[54] TRAILER CUSHIONING AND STABILIZING DEVICE

[72] Inventors: Robert L. Potts; Wiley G. Post, both of Columbus, N. Dak.

[22] Filed: Nov. 19, 1970

[21] Appl. No.: 90,911

Related U.S. Application Data

[63] Continuation-in-part of Ser. No. 808,502, March 19, 1969, abandoned.

[52] U.S. Cl. ..............................280/446 B, 280/457
[51] Int. Cl. ................................................B60d 1/12
[58] Field of Search....280/446 R, 446 B, 406 A, 457

[56] References Cited

UNITED STATES PATENTS 2,699,956   1/1955   Mattson.....................280/457

FOREIGN PATENTS OR APPLICATIONS 945,345   12/1963   Great Britain .........280/446 B

*Primary Examiner*—Leo Friaglia
*Attorney*—Robert E. Kleve

[57] ABSTRACT

The invention comprises a trailer cushioning and stabilizing device having a T-shaped mounting block mounted to the rear of a towing vehicle. A horizontal plate is fixed laterally across the mounting block, and a ball is fixed to the rear of the mounting block. A V-shaped forward end frame of a trailer has a ball socket at its forwardmost end with the socket attached to the T-block. A second plate extends laterally across the V-shaped frame and hydraulic pistons and cylinders connect the first and second plates together.

4 Claims, 10 Drawing Figures

INVENTORS
Robert L. Potts &
Wiley G. Post

BY Robert E. Kleve

ATTORNEY

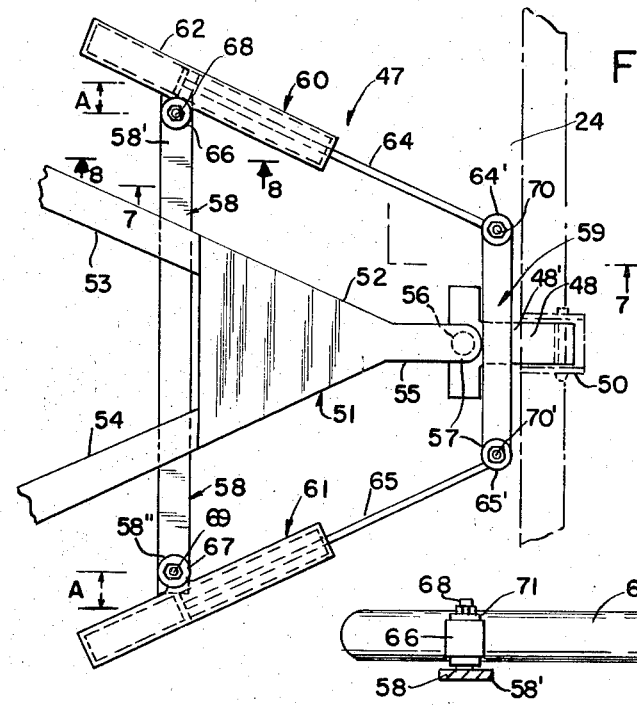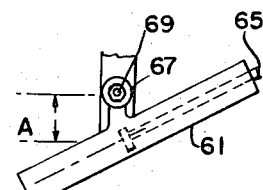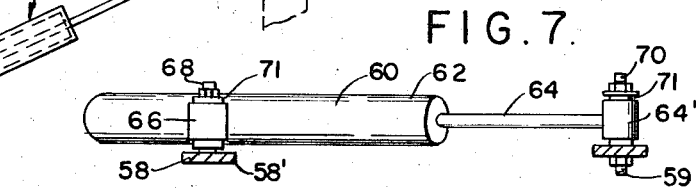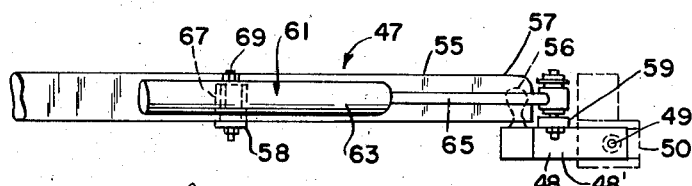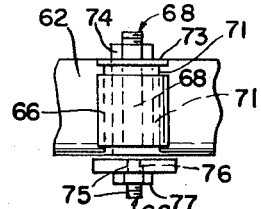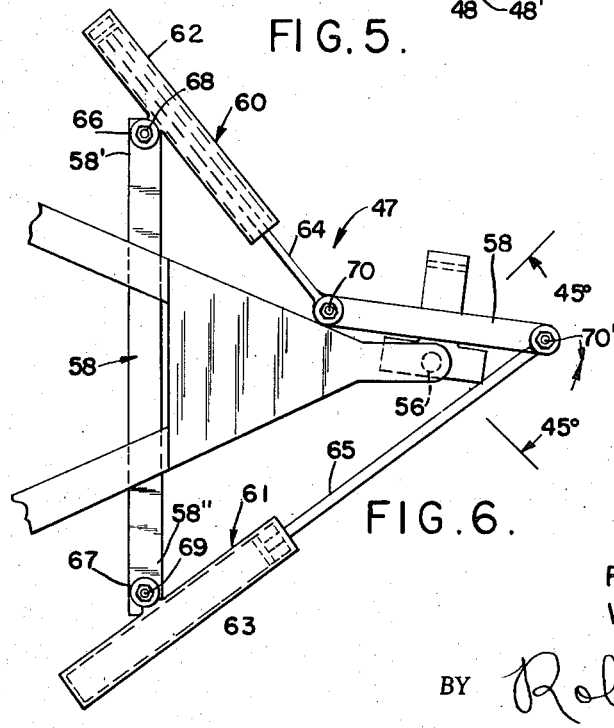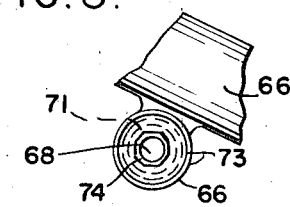

TRAILER CUSHIONING AND STABILIZING DEVICE

This invention relates to stabilizing devices, more particularly, the invention relates to stabilizing devices for trailers. This application is a continuation-in-part of our earlier co-pending patent application, U. S. Ser. No. 808,502, filed Mar. 19, 1969, and entitled Trailer Cushioning and Stabilizing Device now abandoned.

It is an object of the invention to provide a novel cushioning device which will cause the side sway action of the vehicle being towed, to be prevented.

It is a further object of the invention to provide a novel cushioning action for trailers which will cushion the reaction of the trailer to the towing vehicle to prevent jack-knifing in the event of emergency stops.

It is a further object of the invention to provide a novel inexpensive cushioning device for attachment between the towing vehicle and the trailer, which can be inexpensively made and manufactured.

Further objects and advantages of the invention will become apparent as the description proceeds and when taken in conjunction with the accompanying drawings wherein:

FIG. 4 is a top plan view of the second form of trailer cushioning device mounted between a trailer and towing vehicle (not shown) and with the towing vehicle towing the trailer in a straight line.

FIG. 5 is a side elevational view of the second form of trailer and cushioning device.

FIG. 6 is a top plan view of the second form of trailer cushioning and stabilizing device, with the T-block turned counterclockwise to the left slightly in excess of 45° from its center position, shown in FIG. 4.

FIG. 7 is a cross-sectional view taken along line 7—7 of FIG. 4.

FIG. 8 is an enlarged cross-sectional view taken along line 8—8 of FIG. 4.

FIG. 9 is a top view illustrating an enlarged space between the pivot point and cylinder.

FIG. 10 is a top view of FIG. 8.

Briefly stated, the invention comprises a stabilizing device for mounting between a towing vehicle and a trailer, said device comprising a T-shaped mounting block adapted to be pivotally mounted about a horizontal axis to the rear of a towing vehicle, a horizontal plate fixed laterally across said mounting block, said trailer having a V-shaped forward end frame with ball socket at its forwardmost end, said mounted block having a ball adapted to be received in said socket, a second horizontal plate mounted laterally across said V-shaped forward end frame, a pair of hydraulic cylinders rod having one end pivotally mounted to opposing end of said horizontal plate with the other ends pivotally connected to said opposing ends of said first horizontal plate for cushioning the turning movement of the T-block and towing vehicle relative to the V-frame and trailer in either direction, a pair of link chains having their one ends attached to the second plate and the other ends attached to said first plate to limit said turning movement in either direction.

Figure 1:
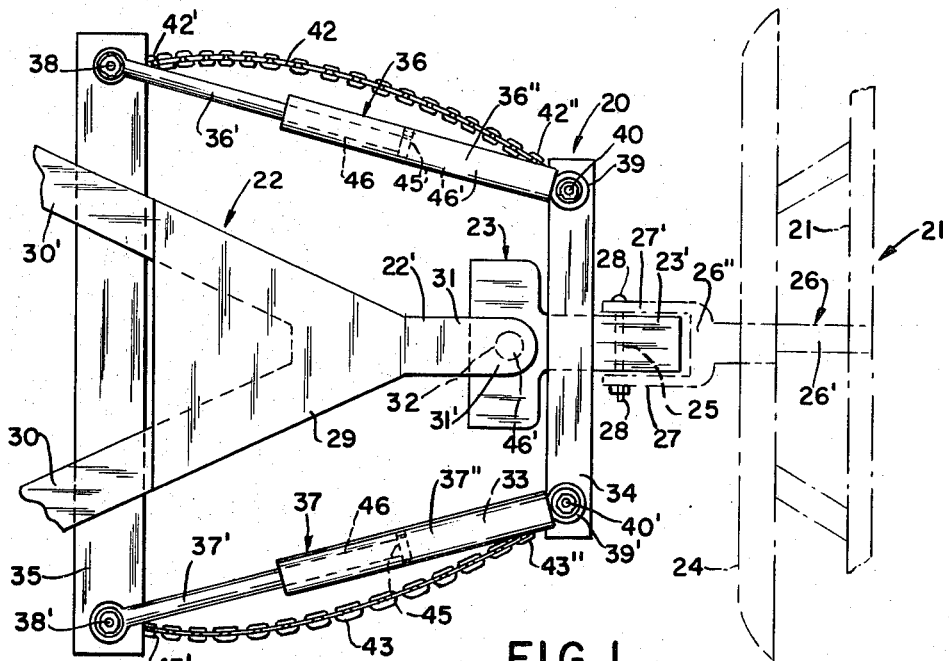
FIG. 1 is a top plan view of the cushioning and stabilizing device mounted between a towing vehicle (shown in phantom lines) and a trailer.

Referring more particularly to the drawing, in FIG. 1, the cushioning and stabilizing device 20 is illustrated mounted between the rear end 21' of a towing vehicle 21 and the forward end 22' of a trailer 22.

The cushioning and stabilizing device 20 has a T-shaped mounting block 23 with the base leg 23' of the T-block projecting forward toward the rear bumper 24 of the towing vehicle. The base leg 23' of the T-block has a horizontal bore 25 extending laterally through the base leg 23'. The towing vehicle has a conventional Y-yoke or head 26 with its base leg 26' fixed in the underside of the towing vehicle 22 with its forked end 26" projecting rearward beyond the rear bumper 24 and with legs 27 and 27' of the forked end 26" projecting on opposite sides of the base leg 23' of the T-block.

A bolt 28 passes through the legs 27 and 27' of the forked end 26" and through the longitudinal bore 25 to pivotally connect the T-block to the yoke 26, and to pivot the T-block freely about the horizontal axis of the bolt 28.

The trailer 22 has a V-shaped forward end frame 29 with a pair of elongated converging side frame members 30 and 30' converging toward one another to form a single beam 31 of the forwardmost end of the trailer. The forward end 31' of the single beam of the trailer has a conventional ball socket 32, and the T-block has a conventional ball 33 for being received in the ball socket 32 and attached thereto. The ball socket 32 also has conventional latching structure (not shown) for latching the ball 33 to the ball socket 32 whereby the T-block may pivot relative to the trailer about the axis of the ball 33 while latched within the ball socket at various different angles.

An elongated first mounting plate 34 is fixed laterally across the base leg 23' of the T-block. A second elongated mounting plate 35 is fixed laterally beneath the converging side frame members 30 and 30' of the trailer.

A pair of hydraulic conventional shock absorbing cylinders 36 and 37 are pivotally mounted on opposite sides of the plate members 34 and 35 by bolts 38 and 38' which pass through bores in the ends of the pistons 36' and 37' of the cylinders, to pivotally connect the pistons 36' and 37' to the plate member 35 so that they may pivot about the vertical end of the bolts 38 and 38'. The cylinder pistons 36' and 37' of the hydraulic cylinder members 36 and 37 have eyelets 39 and 39' fixed to the rearward ends which receive bolts 40 and 40' to pivot the ends of the cylinder pistons 36' and 37' about the vertical axis of the bolts 40 and 40".

The bolts 38 and 38' and 40 and 40' each have the nuts 41 threaded onto their upper ends to pivotally retain the cylinders 36 and 37 to the plate members 34 and 35.

A pair of link chains 42 and 43 have their rearward ends 42' and 43' attached to the bolts 38 and 38' and the forward end 42" and 43" attached to the bolts 40 and 40'. The link chains act to limit the turning movement of the device 20.

OPERATION

The cushioning and stabilizing device 20 operates as follows:

The trailer 22 with the cushioning device 20 attached thereto will be attached to the rear of the towing vehicle 21 by inserting the bolt 28 through the arms 27 and 27' of the yoke and through the bore 25 in the leg 23' of the T-block, whereupon the trailer 27 may be towed from place to place.

Figure 3:
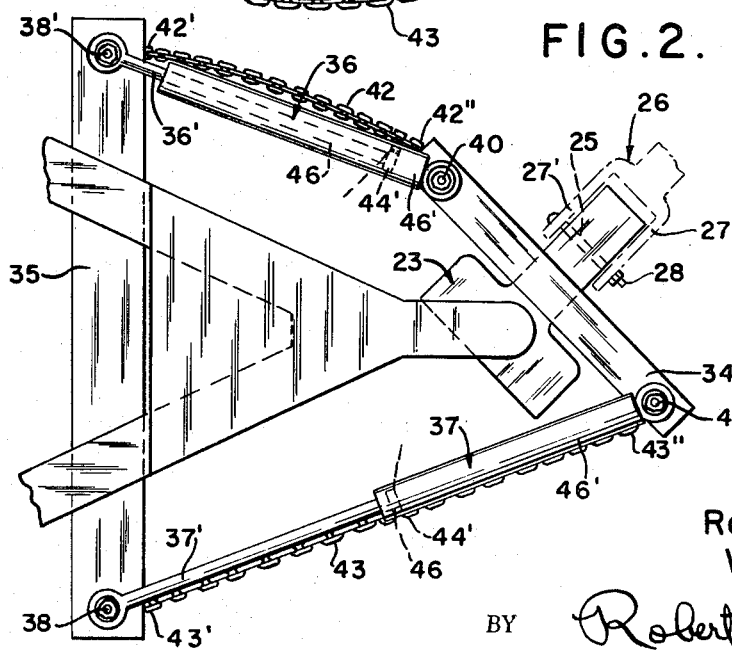
FIG. 3 is a top plan view of the cushioning and stabilizing device similar to FIG. 1, with the device shown in a sharp left turn position.

If the towing vehicle makes a sharp turn to the left as illustrated in FIG. 3, the piston 36' of the left cylinder 36' will retract into the cylinder piston 36'' as illustrated in FIG. 3, and the left chain 42 will become slack. At the same time, the piston 37' of the right cylinder 37 will telescope outwardly in the manner illustrated in FIG. 3 until right chain 43 becomes taut as illustrated in FIG. 3.

Similarly if the towing vehicle makes a sharp turn to the right the reverse operation takes place, with the left piston 36' telescoping outward and the left chain 42 becomes taut, while the right piston 37' retracts and the right chain becomes slack.

The chains 42 and 43 limit the turning movement of the towing vehicle relative to the trailer in either direction by either chain 42 or 43 becoming taut. The chains 42 and 43 will become taut just before the pistons 36' and 37' and their plunger 44 and 44' reach the end of the stake with the cylinder pistons to prevent damage to the cylinders.

The plungers 44 and 44' each have a bore 45 which runs through the plungers from one side to the other side 46' of the cylinder.

The reduced size of the bore 45 limits or restricts the travel of fluid in the cylinder portions 36'' and 37'' from one side of the plunger to the other side, thereby restricts in either direction in the cylinder portions in a conventional manner, thus creates a cushioning effect, as it slows down the speed of movement of trailer to either side about the axis of the ball socket 32, thus preventing the trailer from swinging to either left or right (See FIG. 3) with undue speed, and as a consequence prevents jack-knifing of the trailer relative to the towed vehicle.

SECOND FORM OF CUSHIONING AND STABILIZING DEVICE

The subject matter being added by this Continuation-in-Part application is the second form of cushioning and stabilizing device 47, illustrated in FIGS. 4 – 6, inclusive.

The second form of cushioning and stabilizing device 47 also has a T-shaped mounting block 48 adapted to be rigidly mounted to the rear end of a towing vehicle and has a size and shape and function similar to the T-shaped mounting block 25, illustrated in the first form of the invention.

The U-shaped channel 50 is welded to the underside of the rear bumper of the towing vehicle, and the base leg 48' of the T-block inserted into the sleeve 50 and locked to the sleeve by a pin which is inserted through bores in the sleeve 50 and through a bore 49 in the base leg 48'.

The trailer 51 has a V-shaped horizontally extending forward end frame 52 formed of a pair of converging side frame members 53 and 54 which converge toward one another to form a single beam 55 at the forwardmost end of the trailer. A conventional ball and socket connection is formed by T-block 48 having a conventional ball 56 fixed to the block 48 and a conventional ball socket 57 at the forward end of the beam 55, with the ball 56 being received into the socket 57 and attached thereto by conventional latching structure (not shown) whereby the ball socket 56, the trailer 51, and its frame 52 may pivot relative to the T-block about the axis of the ball 56 at various different angles while the ball is latched within the socket.

A first elongated plate 58 is fixed laterally across the undersides of the converging side frame members 53 and 54 of the trailer 51. A second elongated plate 59 is fixed laterally across the top of the base leg 48' of the T-block 48.

A pair of conventional hydraulic shock absorbing cylinders 60 and 61 which are identical in operation to the shock absorbing cylinders 36 and 37 of the first form of the invention are located on opposite sides of the forward end frame 52. The cylinders 60 and 61 have a cylinder portion 62 and 63, respectively, with pistons 64 and 65 slidably mounted within their respective cylinders 62 and 63, and with the interior construction of the cylinders 60 and 61 being identical with cylinders 58 and 59 whereby the movement of the pistons 64 and 65 in each direction relative to the cylinder portions 62 and 63 is cushioned by the hydraulic fluid in the cylinder portion 62 and 63.

A pair of eyelets 66 and 67 are welded to the cylinder portions 62 and 63, respectively, centrally along the length of the cylinder portions 62 and 63. A pair of pins 68 and 69 pass through the eyelets 66 and 67 to pivotally connect the eyelets and cylinders portions 62 and 63 to the outer ends 58' and 58'' of the plate 58.

The pistons 64 and 65 each have eyelets 64' and 65' at their forward ends and pins 70 and 70' pass through the eyelets 64' and 65' and are fixed to the outer ends 59' and 59'' of the mounting plate to pivotally connect the pistons to the plate 59.

OPERATION

The second form of cushioning and stabilizing device 47 operates as follows:

The T-block 48 will be attached to the sleeve 50 of the towing vehicle by inserting the base leg 68' into the sleeve and inserting a pin through the bores in the sleeve and bore 49 of the T-block. Also, the ball 56 of the T-block will be latched into the ball socket 57 at the forward end of the trailer 51, and the trailer 51 will be towed behind the towing vehicle.

When the trailer 51 is being towed in a straight line, the position of the T-block and hydraulic cylinders 60 and 61 will be as illustrated in FIG. 4.

If the towing vehicle turns to the left the T-block 48 will pivot counterclockwise from its position shown in FIG. 4 toward its position shown in FIG. 6, which causes the piston 64 of the cylinder 60 to retract into the cylinder portion 62, and with the hydraulic action of the fluid in the cylinder cushioning the movement of the piston 64 relative to the cylinder 60. At the same time the counterclockwise movement of the block 48 causes the piston 65 to telescope out from its position shown in FIG. 4 to its position shown in FIG. 6, relative to the cylinder portion 63, and with the fluid in the cylinder portion 63 also acting to cushion the movement of the piston 65 relative to the cylinder 63.

If the towing vehicle turns to the right the reverse takes place, with the T-block 48 pivoting clockwise from its position shown in FIG. 4 causing the piston 64 to telescope out of its cylinder portion 62, and causing the piston 65 to retract into the cylinder portion 63, and with the fluid in the cylinder portion 62 and 63 cushioning the movement of the pistons relative to the cylinders.

The cushioning action of the pistons relative to the cylinders thereby cushions the movement of the T-block relative to the frame of the trailer, to thereby cushion the movement of the trailer relative to the towing vehicle.

The T-block may be pivoted slightly in excess of 45° to the left before the piston 64 will be fully retracted into the cylinder, and similarly the T-block may be pivoted slightly in excess of 45° to the right before the piston 65 will be fully retracted into the cylinder 63.

The T-block is capable of being pivoted further than these arcs to the position shown in FIG. 6, and the cylinders are capable of handling such an extreme turn. However, normally the bumper of the towing vehicle will engage the trailer at approximately 45° to to prevent the full turning of the T-block, in either direction. The piston will have been fully retracted into the cylinder 62 at approximately 45° and will thereafter begin telescoping outward again if the turn continues beyond the 45° to its position shown in FIG. 6. The T-block and cylinders are capable of being pivoted to the same degree to the right or to the left. The action of the cylinders in a right turn is the reverse to the the left turn.

Also, the safety chains 42 and 43, shown in the first form of the invention, may be mounted between pivot points 68 and 70, and 69 and 70', respectively, in the same manner as in the first form of the invention to limit and prevent the over travel of the pistons 64 and 65 with respect to their cylinder portions 62 and 63.

By pivotally mounting the cylinders 62 and 63 to the plate 58 centrally of the length of the cylinders, a strong connection is provided for the cylinders and pistons, and a more favorable configuration can be achieved so that the turning capability of the towing vehicle is not impeded, than in the first form of the invention.

The metal eyelets or sleeves 66 and 67, 64' and 65' each have rubber sleeves 71 mounted within the eyelets, with annular space between the pins or bolts 68,69,70, and 70' and the sleeves 71, so that the cylinders and pistons and their eyelets may pivot relative to their bolts about a horizontal axis to a limited extent relative to their bolts by compressing the sleeve 71; as well as pivot about the vertical axis of the bolts.

The bolts 68,69,70, and 70' each have a washer 73 mounted on top of the sleeves 71, the bolts passing through the washer 73 and a nut 74 is threaded onto the bolt on top of the washer 73, to lock the assembly together. The washers 73 have an annular bore larger than the bolts for receiving the bolts though smaller than the nuts 74 and sleeves 71.

The lower end of the bolts 68, 69, 70, and 70' have a slightly reduced shoulder portion 75 passing through a bore 76 in the plate 58 and 59 and a nut 77 is threaded onto the lower end of the bolts to lock the bolts to their respective plates 58 and 59.

Figure 2:
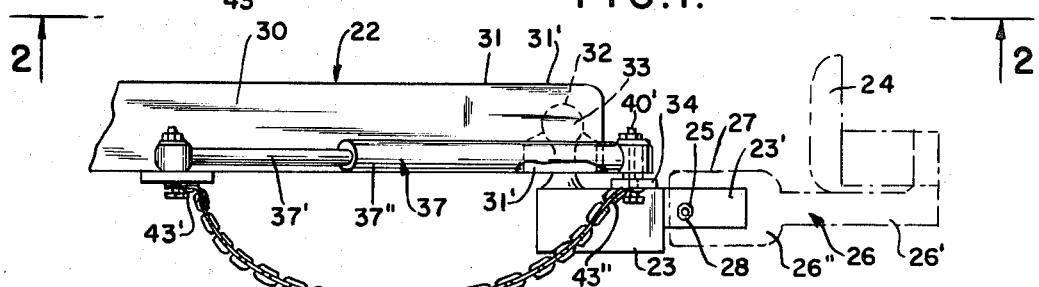
FIG. 2 is a side elevational view of the cushioning and stabilizing device taken along line 2—2 of FIG. 1.

The pivoting of the cylinders 58 and 59 to their plate 58 at pivot points 68 and 69 on the inside of the cylinders and centrally of the length of the cylinders results in less stroke being required of the cylinders to accomplish the turning movement of the T-block, while maintaining a wider turning arc movement and flexibility of movement of the T-block, than in the first form (FIG. 1–3).

The pivot points 68 and 69 may be spaced in further inward toward one another relative to one another and their cylinders, than they are located in FIGS. 4–7, 8 and 10, inclusive, and as indicated by numeral A. This may be accomplished as shown in FIG. 9 for cylinder 61, as indicated by numeral A, and may be accomplished in the same opposing manner for cylinder 62. While the pivot points will be spaced further inward toward one another as shown in FIG. 9, the cylinders themselves will be spaced the same distance apart as before. Thus the length of plate 58 will remain the same as before and the cylinders will still be positioned at the outer ends of plate 58 although the pivot points for the cylinders will be moved further inward. This spacing of the pivot points even further inward results in even less cylinder stroke being required of the cylinders without sacrificing the wide turning arc of the T-block relative to the trailer than when pivoting the cylinders at their rear ends (FIG. 1–3).

Thus, it will be seen that a novel simplified trailer stabilizing device has been provided for effectively cushioning the turning action between the towing vehicle and the trailer for at least 90 degrees in either direction.

It will be obvious that various changes and departures may be made to the invention without departing from the spirit thereof and accordingly it is not intended that the invention be limited to that specifically described in the specification or as illustrated in the drawings but only as set forth in the appended claims.

What Is Claimed Is:

1. A stabilizing and cushioning device for attachment between the rear end of a towing vehicle and a trailer frame, said device comprising a mounting block having a swivel connection along its rearward end to the forward end of the trailer frame, said mounting block having its forward end mounted to the towing vehicle, a lateral plate extending across the mounting block, a second lateral plate extending laterally across the forward end of the trailer, a pair of hydraulic cylinders each has a telescoping piston with said pistons pivotally connected at their outer ends to the outer opposing ends of the first lateral plate, said cylinders having mounting means pivotally connecting said cylinders to the outer ends of said second plate at a location intermediate the ends of the cylinders to cushion the movement of the trailer in either direction about the swivel connection between the mounting block and frame.

2. A stabilizing and cushioning device for attachment between the rear end of a towing vehicle and a trailer frame, said device comprising a mounting block having a swivel connection along its rearward end to the forward end of the trailer frame, said mounting block having its forward end mounted to the towing vehicle, a lateral plate extending laterally across the mounting block, a second lateral plate extending laterally across the forward end of the trailer, a pair of elongated hydraulic cylinders each has a telescoping piston with said pistons pivotally connected at their outer ends to the outer opposing ends of the first lateral plate, said cylinders having mounting means pivotally connecting each of said cylinders at a location intermediate the length of the cylinder and laterally adjacent the cylinder to the outer ends of the second plate, to cushion the movement of the trailer in either direction about the swivel connection between the mounting block and frame.

3. A stabilizing and cushioning device according to claim 1 wherein said intermediate the ends of the cylinder location of said mounting means is centrally intermediate the ends of the cylinder.

4. A stabilizing and cushioning device for attachment between the rear end of a towing vehicle and a trailer frame, said device comprising a mounting block having a swivel connection along its rearward end to the forward end of the trailer frame, said mounting block having its forward end mounted to the towing vehicle, a lateral plate extending laterally across the mounting block, a second lateral plate extending laterally across the forward end of the trailer, a pair of hydraulic cylinders each has a piston telescoping from its forward end with said pistons pivotally connected at their forward outer ends to the outer opposing ends of the first lateral plate, said cylinders having mounting means pivotally connecting each of said cylinders at a location spaced forward from the rearward end of the cylinder and laterally adjacent the cylinder to the outer ends of the second plate, to cushion the movement of the trailer in either direction about the swivel connection between the mounting block and frame.

* * * * *